United States Patent
Gray

(10) Patent No.: US 6,550,430 B2
(45) Date of Patent: Apr. 22, 2003

(54) METHOD OF OPERATING A DUAL FUEL INTERNAL

(76) Inventor: Clint D. J. Gray, RR #1, Lanark, Ontario (CA), K0G 1K0

( * ) Notice: Subject to any disclaimer, the term of this patent is extended or adjusted under 35 U.S.C. 154(b) by 0 days.

(21) Appl. No.: 09/793,532

(22) Filed: Feb. 27, 2001

(65) Prior Publication Data

US 2002/0157619 A1 Oct. 31, 2002

(51) Int. Cl.$^7$ .......................... F02B 43/00; F02M 21/02
(52) U.S. Cl. .................. 123/27 GE; 123/525; 44/300; 585/14; 208/15
(58) Field of Search ................ 123/1 A, 27 GE, 123/526, 525, 527, 575; 44/300; 208/15, 16, 17, 18, 19; 585/14

(56) References Cited

U.S. PATENT DOCUMENTS

| | | | |
|---|---|---|---|
| 3,615,292 A | * 10/1971 | Badin | 44/363 |
| 4,332,223 A | * 6/1982 | Dalton | 123/143 B |
| 4,520,215 A | * 5/1985 | Owen et al. | 208/15 |
| 4,527,516 A | 7/1985 | Foster | 123/27 GE |
| 4,543,930 A | * 10/1985 | Baker | 123/299 |
| 4,621,599 A | * 11/1986 | Igashira et al. | 123/300 |
| 4,645,585 A | * 2/1987 | White | 208/15 |
| 4,831,993 A | 5/1989 | Kelgard | 123/525 |
| 4,876,988 A | 10/1989 | Paul et al. | 123/1 A |
| 4,955,326 A | 9/1990 | Helmich | 123/27 GE |
| 4,990,239 A | * 2/1991 | Derr et al. | 208/111.15 |
| 5,050,550 A | 9/1991 | Gao | 123/275 |
| 5,365,902 A | 11/1994 | Hsu | 123/299 |
| 5,389,111 A | * 2/1995 | Nikanjam et al. | 44/300 |
| 5,389,112 A | * 2/1995 | Nikanjam et al. | 44/300 |
| 5,450,829 A | 9/1995 | Beck | 123/435 |
| 5,549,087 A | 8/1996 | Gray, Jr. et al. | 123/254 |
| 5,814,109 A | * 9/1998 | Cook et al. | 44/300 |
| 5,858,030 A | * 1/1999 | Waller et al. | 44/443 |
| 6,032,617 A | 3/2000 | Willi et al. | 123/27 GE |
| 6,095,102 A | 8/2000 | Willi et al. | 123/27 GE |

(List continued on next page.)

FOREIGN PATENT DOCUMENTS

| | | | | |
|---|---|---|---|---|
| EP | 0433047 | * | 6/1991 | C10G/69/04 |
| JP | 170598 | * | 7/1991 | C10G/35/04 |

OTHER PUBLICATIONS

Rudolf H. Stanglmaier and Charles E. Roberts, Southwest Research Institute, "Homogeneous Charge Compression Ignition (HCCI): Benefits, Compromises, and Future Applications", SAE Paper 1999–01–3682.

(List continued on next page.)

Primary Examiner—Henry C. Yuen
Assistant Examiner—Hai Huynh
(74) Attorney, Agent, or Firm—Jones, Tullar & Cooper, P.C.

(57) ABSTRACT

The combustion chamber of a high speed, two stroke or four stroke, internal combustion engine is provided with a generally homogeneous mixture of combustion air and two types of fuel, one having a high resistance to ignition (high octane), the other having a low resistance to ignition (high cetane), the fuels being supplied in a ratio which optimizes combustion for varying operating conditions. A high cetane fuel may also be injected into the combustion chamber to initiate the combustion in the form of rapidly propagating, multiple flame fronts. Moderate combustion pressures, rates of combustion pressure rise and low levels of combustion knock are generated. High compression pressures and little or no combustion air throttling are employed allowing high levels of thermal efficiency, fuel efficiency, output power and low levels of exhaust emissions. Low cost engine applications employ slightly lower compression pressures and an electrical spark to initiate combustion.

9 Claims, 5 Drawing Sheets

U.S. PATENT DOCUMENTS

| | | | | |
|---|---|---|---|---|
| 6,150,575 | A | * 11/2000 | Angevine et al. | 44/300 |
| 6,222,082 | B1 | * 4/2001 | Hubbard et al. | 44/300 |
| 6,230,683 | B1 | * 5/2001 | zur Loye et al. | 123/27 GE |
| 6,291,732 | B2 | * 9/2001 | Hubbard et al. | 44/300 |
| 6,302,929 | B1 | * 10/2001 | Gunnerman | 44/302 |
| 6,461,497 | B1 | * 10/2002 | Pedersen | 208/15 |
| 6,463,907 | B1 | * 10/2002 | Hiltner | 123/304 |

OTHER PUBLICATIONS

Magnus Christensen, Anders Hultqvist and Bengt Johansson, Lund Institute of Technology, "Demonstrating the Multi Fuel Capability of a Homogeneous Charge Compression Ignition Engine with Variable Compression Ratio", SAE Paper 1999–01–3679.

Magnus Christensen and Bengt Johansson, Division of Combustion Engines, Lund Institute of Technology, "Infuence of Mixture Quality on Homogeneous Charge Compression Ignition", SAE Paper 982452.

Matsuo Odaka, Hisakazu Suzuki, Noriyuki Koike and Hajime Ishii, Traffic Safety and Nuisance Research Institute, Search for Optimizing Control Method of Homogeneous Charge Diesel Combustion, SAE Paper 1999–01–0184.

Peter Van Blarigan, Nicholas Paradiso and Scott Goldsborough, Sandia National Laboratories, "Homogeneous Charge Compression Ignition with a Free Piston: A New Approach to Ideal Otto Cycle Performance", SAE Paper 982484.

Hisakazu Suzuki, Noriyuki Koike and Matsuo Odaka, Traffic Safety and Nuisance Research Institute, Combustion Control Method of Homogeneous Charge Diesel Engines, SAE Paper 980509.

Allen W. (Bill) Gray III, Thomas W. Ryan III, Southwest Research Institute, "Homogeneous Charge Compression Ignition (HCCI) of Diesel Fuel", SAE Paper 971676.

Thomas W. Ryan III and Timothy J. Callahan, Southwest Research Institute, "Homogeneous Charge Compression Ignition of Diesel Fuel", SAE Paper 961160.

* cited by examiner

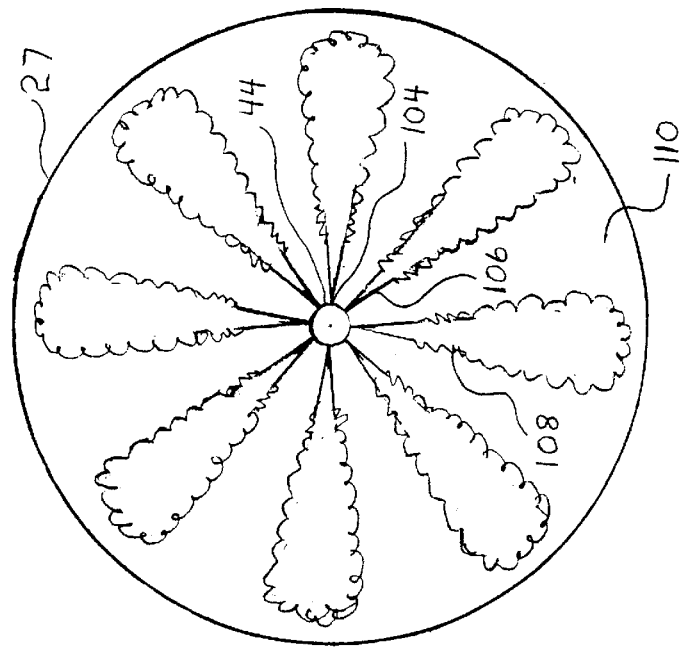

End View of High Cetane Pilot Fuel Injection into Combustion Chamber

Figure 4

27) Combustion Chamber
44) Multiple Orifice High Cetane Pilot Injector
104) High Cetane Pilot Injector Orifices (eight)
106) High Velocity Jets of High Cetane Pilot Fuel
108) High Velocity Flame Fronts Resulting from Combustion of High Velocity Jets of High Cetane Pilot Fuel
110) Homogeneous or Near Homogeneous High Octane and High Cetane Air/Fuel Mixture

METHOD OF OPERATING A DUAL FUEL INTERNAL

BACKGROUND OF THE INVENTION

1. Technical Field of the Invention

This invention provides an improved method of operating a dual fuel internal combustion engine, especially where the engine is required to run at high speed, for example at over 3,000 rpm. The fuels used include one high octane fuel such as gasoline, and one fuel of high cetane value. The engine is preferably a conventional reciprocating engine of the piston in cylinder type.

2. Prior Art

Traditionally there have been four primary modes of operation for reciprocating internal combustion engines: spark ignition (SI), homogeneous charge compression ignition (HCCI), compression ignition (CI) and dual fuel compression ignition (DFCI). SI and CI engines have been commercially dominant due to the more simplistic and inexpensive control systems required for satisfactory operation.

SI Engine

Spark ignition (SI) engine operation involves ignition of a homogeneous or stratified mixture of air and readily vaporized high octane fuel, such as gasoline, using an electrical discharge (spark) from one or more ignition devices such as a sparkplug, located in the combustion chamber of the engine. The fuel, which may be in a gaseous or atomized/vaporized liquid form, may be entrained with the air drawn into the cylinder of the engine, using a carburetor or fuel injector located in the intake air system. Alternately, the fuel may be injected directly into the cylinder through a fuel injector located in the cylinder or cylinder head. Engine load and speed control is primarily accomplished by controlling the quantity of air which enters the cylinder and remains in the cylinder during the compression process, just prior to ignition of the air/fuel mixture. The fuel quantity is reduced approximately proportional to the air quantity to provide a combustible mixture. The combustible mixture ranges between slightly richer than stoichiometric at high loads to no more than 35% leaner than stoichiometric at low to moderate loads. Throttling of the air or air/fuel mixture at low loads reduces the quantity of air/fuel mixture drawn into the combustion chamber, thereby reducing compression pressures and correspondingly reducing thermal efficiency and fuel efficiency. In addition, throttling increases the resistance of air flow into the combustion chamber generating a parasitic loss in engine power, further reducing overall thermal efficiency and fuel efficiency.

Ignition and combustion of the air/fuel mixture in SI engines is relatively slow, particularly at low loads, resulting in less than optimal thermal efficiency and fuel efficiency since only a portion of the fuel's energy is released at the point of maximum compression. Combustion of the air/fuel mixture begins at the sparkplug (under normal operating conditions). Since the flame has a single flame front, a finite period of time, which is dependent on many factors, is required for the flame (generated by the spark at the sparkplug) to propagate across the combustion chamber. The air/fuel mixture furthest from the sparkplug is ignited substantially later than the air/fuel mixture near the sparkplug. During flame propagation the pressure in the combustion chamber increases. The compressed air/fuel mixture furthest from the flame front is compressed to higher and higher values awaiting the flame. If the compression pressure and corresponding temperature of the air/fuel mixture awaiting the flame is sufficient, as well as the exposure time, the air/fuel mixture will autoignite before the flame reaches it. Autoignition of the air/fuel mixture results in very rapid rates of combustion generating high combustion pressures, rates of combustion pressure rise and combustion knock, which may cause engine damage depending on many factors. The octane rating of a fuel is a measure of the fuel's resistance to autoignition and combustion knock, with higher octane values indicating greater autoignition resistance. SI engines employ high octane fuels to minimize autoignition of the air/fuel mixture.

SI engine thermal efficiency and fuel efficiency is less than optimal due to compression pressure constraints dictated by many factors including fuel octane, throttling of the air or air/fuel mixture at low loads which results in increased parasitic losses in engine power and the relatively slow combustion process. Although the combustion process is relatively slow, increases in engine speed generate increased turbulence within the combustion chamber. The increased turbulence accelerates propagation of the flame front and the combustion process such that combustion efficiency is maintained even at high engine speeds.

HCCI Engines

Homogeneous charge combustion ignition (HCCI) engines operate similarly to SI engines in that a homogeneous or partially stratified mixture of air and high octane fuel such as gasoline or natural gas is combusted. However, ignition of the air/fuel mixture is not accomplished using a spark. Ignition is accomplished by compressing the air/fuel mixture to a high degree such that instantaneous autoignition of the air/fuel mixture occurs throughout the combustion chamber nearly simultaneously. The fuel, which may be in a gaseous or atomized/vaporized liquid form, may be entrained with the air drawn into the cylinder of the engine, using a fuel injector located in the intake air system. Alternately, the fuel may be injected directly into the cylinder through a fuel injector located in the cylinder or cylinder head. Engine load and speed control is primarily accomplished by controlling the quantity of fuel which enters the cylinder and remains in the cylinder during the compression process, just prior to ignition of the air/fuel mixture. The quantity of air supplied to the engine is not throttled to control engine load and speed as is done with SI engines.

HCCI engines were developed to provide greater thermal efficiency and fuel efficiency than SI engines, as well as to reduce low load emissions of oxides of nitrogen (NOx). HCCI engines can operate at higher compression pressures prior to combustion than SI engines, for the same fuel octane value since, unlike with SI engines, autoignition of the air/fuel mixture is desired. In addition, the autoignition process causes very rapid combustion of the air/fuel mixture. The HCCI combustion process generates higher thermal efficiency and fuel efficiency than the SI combustion process, due to higher compression of the air/fuel mixture and a very short duration combustion process whereby most of the energy of the fuel is released at or near the point of maximum compression. In addition, less energy is required to induct air into the engine at low loads since the combustion air is not throttled to control load as is done with SI engines.

However, due to the very short combustion duration and high degree of air/fuel mixture compression, excessive combustion pressures and rates of combustion pressure rise are generated at high loads with stoichiometric or near stoichiometric air/fuel mixtures. As such, HCCI engines are typically operated at low to moderate loads with lean air/fuel mixtures, thereby reducing combustion pressures by reducing the quantity of heat released and by increasing the combustion duration slightly. The lean air/fuel mixtures also tend to decrease NOx emissions relative to SI engines at equivalent loads, due to reduced peak combustion temperatures. However, the lean air/fuel mixtures required to provide low loads tend to generate high levels of unburned hydrocarbons, typically referred to as total hydrocarbon (THC) emissions, due to incomplete combustion of the fuel. At low loads incomplete combustion is caused by low combustion temperatures and is further exacerbated by the high resistance to ignition of the high octane fuel and lean air/fuel mixture.

In addition to load limitations, difficulties are encountered with HCCI engines with regard to controlling the timing and intensity of the autoignition process for optimum operation. Autoignition timing and intensity is not controlled by a single factor, numerous factors including fuel octane, intake air pressure and temperature, the quantity of exhaust gas recirculation in the intake air system, air/fuel ratio, combustion chamber temperature and piston temperature must be accounted for. Sophisticated computer monitoring and control systems as well as extensive sensor implementation are required to control the aforementioned parameters. As such HCCI engines are primarily in developmental stages and have been employed in few commercial applications.

CI Engines

Compression ignition (CI) engine operation is similar to HCCI operation in that a spark is not employed and autoignition of the fuel is accomplished by high compression pressures and temperatures. In addition, engine load and speed control is accomplished by controlling the quantity of fuel which enters the combustion chamber. The quantity of air supplied to the engine is not throttled to control engine load and speed as is done with SI engines.

However, unlike HCCI and SI engines, CI engines operate on low octane fuel, primarily diesel fuel. Low octane fuel such as diesel fuel is typically given a cetane value instead of an octane value. The cetane rating is the direct opposite of the octane rating since the cetane rating is a measure of a fuel's tendency towards autoignition. Higher cetane values indicate reduced resistance to autoignition and correspond to lower octane values. Commercial diesel fuel has a moderate cetane value in the range of 37 to 55 with most diesel fuel being sold with a cetane value of 40 to 47.

During CI operation only air is compressed during the majority of the compression process and as such very high compression pressures can be employed. Near the end of the compression process, injection of the fuel (under high pressure) into the combustion chamber is initiated. Ignition of the diesel fuel is not instantaneous upon injection into the combustion chamber. A period of time, referred to as the ignition delay period, exists between injection of the diesel fuel and the onset of combustion. The ignition delay period depends on numerous factors including engine speed, compression pressure and temperature, the quantity of diesel fuel injected and the cetane value of the diesel fuel. Ignition delay decreases with increasing compression pressure and temperature, increasing fuel cetane value, increasing quantity of fuel injected and decreasing engine speed.

The ignition delay period for CI engines typically ranges from 5 to 25 crankshaft degrees depending on the type of engine, engine speed/load, compression pressures and temperatures and the cetane value of the diesel fuel. During injection of the diesel fuel prior to ignition, the fuel begins to disperse and mix with the combustion air. If the ignition delay period is decreased, less air/fuel mixing occurs prior to ignition such that the combustion rate is reduced and rates of combustion pressure rise are low, minimizing combustion knock. If the ignition delay period is increased, more air/fuel mixing occurs prior to ignition such that the combustion rate is increased and rates of combustion pressure rise are high, generating significant combustion knock and engine stresses. At higher loads additional fuel is injected after ignition of the fuel in the combustion chamber. The rate of combustion of the additional fuel is controlled by the rate of injection. Although CI combustion occurs by autoignition, ignition of the fuel occurs with only partial mixing of the air and fuel, such that combustion is relatively slow in comparison to HCCI combustion in which the air and fuel are thoroughly mixed. In addition, ignition of the fuel occurs gradually since the fuel is injected into the combustion chamber over a finite period of time during the combustion process. As such CI combustion can generate high loads with peak combustion pressures, rates of combustion pressure rise and levels of combustion knock which are significantly lower than for typical HCCI combustion.

The CI combustion process generates higher thermal efficiency and fuel efficiency than the SI combustion process, due to higher compression pressures. In addition, less energy is required to induct air into the engine at low loads since the combustion air is not throttled to control load as is done with SI engines. CI engines can be operated satisfactorily throughout the range of low to high loads.

However, CI engines typically generate less power and engine speed than comparable displacement SI engines. The CI ignition and combustion processes are slow resulting in a reduction in combustion efficiency at moderate to high engine speeds. In addition, since the air and fuel are not thoroughly mixed prior to the combustion process not all of the air is fully utilized for output power in a CI engine. The high combustion pressures generated in the CI engine and localized rich air/fuel mixtures also tend to generate higher NOx and particulate matter (PM) emissions than SI and HCCI engines.

DFCI Engines

Dual fuel combustion ignition (DFCI) engines are typically low speed engines operated on a combination of natural gas and diesel fuel. Natural gas has historically been less expensive than diesel fuel and provides for cleaner combustion with reduced emissions. Engine load and speed control is primarily accomplished by controlling the combined quantity of natural gas and diesel fuel which are combusted with the air in the combustion chamber. The combustion air is not throttled to control load as is done with SI engines. In most applications the engine is operated as a conventional single fuel CI engine on diesel fuel at low loads. At higher loads natural gas is entrained into the air inducted into the combustion chamber, providing a homogeneous charge of air and natural gas to the combustion chamber. Autoignition of the natural gas by compression pressure and temperature is avoided by providing lean mixtures of air/natural gas. Lean air/fuel mixtures have a higher resistance to autoignition than stoichiometric air/fuel mixtures. Near the end of the compression process a small quantity of diesel fuel is injected into the combustion chamber through a pilot injector.

As previously discussed with regard to CI engines, ignition of the diesel fuel is not instantaneous upon injection into the combustion chamber. A period of time, referred to as the ignition delay period, exists between injection of the diesel fuel and the onset of combustion of the diesel fuel. The air/natural gas mixture contributes the majority of the energy to the combustion process at high loads. As such the quantity of pilot diesel fuel supplied for ignition purposes is relatively small in comparison to high load single fuel CI operation. The small quantity of pilot diesel fuel injected further increases the ignition delay period such that the pilot diesel fuel must be injected into the combustion chamber earlier in the compression process at maximum engine load and speed than would be the case for single fuel CI operation. Upon completion of the ignition delay period, ignition of the diesel fuel occurs and in turn causes ignition of the lean homogeneous air/natural gas mixture.

DFCI engines typically generate high thermal efficiency and fuel efficiency, similar to CI diesel fuel combustion. DFCI engines like CI diesel engines must operate at slower engine speeds than SI engines due to the lengthy ignition delay period of the diesel fuel and the slower combustion process. The ignition delay period can be reduced somewhat for CI engines as engine speed increases by increasing compression pressures through turbocharging. However, increasing compression pressures to reduce ignition delay in a DFCI engine would cause unwanted instantaneous autoignition of the homogeneous air/natural gas mixture during the compression process, resulting in excessive combustion pressures and rates of combustion pressure rise. As such DFCI engine speeds tend to be more limited than for CI engines. Exhaust NOx and PM emissions at loads and speeds in which natural gas and diesel fuel are supplied to the combustion chamber are lower than for CI operation on diesel fuel alone.

The DFCI fuel control system is necessarily more complex than for SI and CI engines since the quantity and timing of two fuels entering the combustion chamber must be controlled. In addition, since instantaneous autoignition of the air/natural gas could result in excessive combustion pressures and rates of pressure rise, the control system must be capable of detecting autoignition and adjusting both fuel supplies accordingly to eliminate autoignition. Due to the complexity and corresponding cost of the DFCI natural gas/diesel fuel systems and limited range of engine operating speeds for efficient combustion, commercial applications have typically been applied to large low speed engines such as locomotive and stationary generator engines. Limited bus and truck fleet applications have also been commercialized.

Several variations of the natural gas/diesel dual fuel DFCI engine have been developed. A number of U.S. patents, including but not limited to the following, refer to internal combustion engines operating on two fuels:

| | | |
|---|---|---|
| 4,527,516 | Jul. 9, 1985 | Foster (Expired) |
| 4,831,993 | May 23, 1989 | Kelgard |
| 4,876,988 | Oct. 31, 1989 | Paul et al. |
| 4,955,326 | Sep. 11, 1990 | Helmich |
| 5,050,550 | Sep. 24, 1991 | Gao (Expired) |
| 5,365,902 | Nov. 22, 1994 | Hsu |
| 5,450,829 | Sep. 19, 1995 | Beck |
| 5,549,087 | Aug. 27, 1996 | Gray et al. |
| 6,032,617 | Mar. 7, 2000 | Willi et al. |
| 6,095,102 | Aug. 1, 2000 | Willi et al. |

U.S. Pat. No. 6,032,617 describes an engine whereby a gaseous fuel being natural gas and a conditioning fuel being lubricating oil or diesel fuel or an emulsion of water and diesel fuel, are injected into the combustion air to form a homogeneous mixture of air, natural gas and conditioning fuel. Near the end of the compression process a small quantity of diesel fuel, referred to as pilot fuel, is injected into the combustion chamber through a pilot injector. The high compression pressures within the combustion chamber during the compression process causes ignition of the diesel pilot fuel. Ignition of the diesel pilot fuel is not instantaneous upon injection into the combustion chamber. A period of time, referred to as the ignition delay period, exists between injection and the onset of combustion of the diesel fuel, as described for CI engine operation above. The ignition delay period depends on numerous factors including engine speed, compression pressure and temperature, the quantity of diesel fuel injected and the cetane value of the diesel fuel. Upon completion of the ignition delay period, ignition of the diesel fuel occurs causing the pressure and temperature in the combustion chamber to increase. The increased combustion chamber pressure and temperature generated by combustion of the diesel pilot fuel causes the homogeneous charge of natural gas and conditioning fuel to autoignite. The conditioning fuel, being more ignitable than the natural gas, is used to improve the ignitability of the homogeneous air/fuel mixture, thereby reducing the quantity of diesel pilot fuel required for ignition. Reducing the quantity of diesel pilot fuel reduces NOx emissions. In this prior patent the only pilot and conditioning fuels described are oils or diesel fuels, and the only gaseous fuel is natural gas.

U.S. Pat. No. 5,050,550 (which has now expired) describes a DFCI engine whereby at low loads the engine is operated as a CI engine on diesel fuel. At moderate loads gasoline is entrained into the combustion air providing a homogeneous charge of lean air/gasoline mixture to the combustion chamber. Near the end of the compression process a small quantity of diesel fuel is injected into the combustion chamber through a pilot injector which is located in a pre-combustion chamber separated by a passage from the combustion chamber of the cylinder; i.e. the diesel fuel is not injected directly. The high compression pressure generated in the CI engine during the compression process causes ignition of the diesel fuel after an ignition delay period. Ignition of the diesel fuel in turn causes ignition of the homogeneous charge of gasoline. Instantaneous autoignition of the air/gasoline by compression pressure and temperature is avoided by providing lean mixtures of air/gasoline, thereby eliminating excessive combustion pressures and rates of combustion pressure rise which could result in engine damage. During operation at maximum load a significant quantity of diesel pilot injection must be employed since the lean air/gasoline mixture provides less power than a stoichiometric mixture of air/gasoline. No fuel other than diesel is suggested for pilot injection. Only lean air/gasoline mixtures are employed so as to avoid autoignition of the air/gasoline by compression pressure and temperature.

The remaining patents are all generally similar, and all relate to dual fuel engines using either natural gas, ethanol or gasoline as the main source of energy, and oils such as diesel fuel as the pilot fuel for ignition. The amounts of pilot fuel are small compared to the main energy source, say 4 to 7% in relation to energy content; however the amounts of the pilot fuel are large enough that constant replenishment is required.

The aforementioned DFCI combustion systems incorporate many of the desirable characteristics of SI, CI and HCCI combustion systems including high thermal efficiency, high fuel efficiency and low emissions. However, as indicated above these combustion systems are unsuited for high engine speeds. The following obstacles would be encountered at high engine speeds typical of small engines (lawnmower/snowmobile), automotive engines (car/light truck) and racing engines particularly if high levels of thermal efficiency, fuel efficiency, output power, low levels of exhaust emissions, moderate combustion pressures and rates of combustion pressure rise as well as low levels of combustion knock are desired:

1) The complex control system incorporating a high pressure diesel pilot injection system would not be feasible for small, low cost, commercial engines.

2) The maximum engine speed at which high levels of thermal efficiency, fuel efficiency and output power can be obtained is limited due to the lengthy ignition delay period of commercial diesel fuel. The ignition delay period of the diesel fuel is substantial due to the moderate cetane value. As engine speeds increase the compression process occurs more rapidly such that the diesel pilot fuel must be injected earlier in the compression process. However, the compression pressures and temperatures which exist earlier in the compression process are relatively low and do not effectively prepare the diesel pilot fuel for autoignition. As such the ignition delay period increases rapidly with increasing engine speed. As engine speeds increase ignition occurs well after the point of maximum compression resulting in reduced thermal efficiency, fuel efficiency and output power. Further increases in engine speed result in misfiring.

3) Advancing the diesel pilot injection timing at moderate to high engine speeds to compensate for ignition delay, results in substantial mixing of the diesel pilot fuel with the homogeneous air/fuel mixture. Mixing of the diesel pilot fuel with the homogeneous air/fuel mixture lowers the octane of the homogeneous mixture, since diesel fuel has a lower octane than natural gas and gasoline. Instantaneous autoignition of the diesel fuel occurs throughout a large portion of the combustible air/fuel mixture. A graph described below indicates the high combustion pressures produced when diesel pilot fuel is injected into a homogeneous air/gasoline mixture at an engine speed of 3,800 rpm and high load. High combustion pressures, rates of combustion pressure rise and high levels of audible combustion knock are generated resulting in the potential for engine damage.

4) High autoignition combustion pressures and rates of combustion pressure rise at moderate to high engine speeds could be reduced by delaying injection of the diesel pilot fuel or reducing the quantity of diesel pilot injection such that combustion begins during the expansion process, well after the point of maximum compression. However, thermal efficiency, fuel efficiency and output power would be reduced since the combustion products would not be expanded over the full expansion process. In addition, delaying the combustion process would increase the temperature of the combustion products during the exhaust process, thereby increasing the temperature of the exhaust system components and possibly shortening the life expectancy of the exhaust system components.

5) High autoignition combustion pressures and rates of combustion pressure rise at moderate to high engine speeds could be reduced by employing lean homogeneous air/fuel mixtures since lean air/fuel mixtures have a higher resistance to ignition and combust slower than stoichiometric air/fuel mixtures. However, output power would be reduced with lean air/fuel mixtures.

6) High autoignition combustion pressures and rates of combustion pressure rise at moderate to high engine speeds could be reduced by reducing compression pressures. However, reducing compression pressures would further increase the diesel pilot injection ignition delay period. In addition, reducing compression pressures would lower thermal efficiency, fuel efficiency and output power.

7) The lengthy ignition delay period of the diesel pilot fuel is such that ignition timing relative to the compression and expansion processes would be imprecise and difficult to control at moderate to high engine speeds.

8) High engine speeds typical of small engines and racing engines could not be attained since the diesel pilot injection ignition delay period would be of such duration that ignition would not occur during the compression or expansion processes.

9) Supplying an engine with a homogeneous air/fuel mixture containing a conditioning fuel such as diesel fuel would tend to increase THC emissions, since diesel fuel has a high initial boiling point and does not vaporize readily unless substantial heat is applied. Diesel fuel is not normally supplied to an engine in the form of a homogeneous air/fuel mixture since the fuel vaporizes very little prior to the combustion process and as such only partially combusts, resulting in THC emissions and exhaust smoke. High engine speeds would further exacerbate the situation since less time would be available for vaporization of the diesel fuel.

10) DFCI natural gas/diesel fuel and gasoline/diesel fuel engines as outlined in the referenced patents operate with CI combustion of diesel fuel at low loads and as such are applied to CI engines incorporating a combustion chamber designed to optimize CI combustion of diesel fuel. CI combustion chamber designs are not optimized for combustion of a homogeneous air/fuel mixture. In addition, high speed four stroke engines require significant intake and exhaust valve travel into the combustion chamber to provide the necessary flow rates of combustion air and exhaust gases. CI engines typically operate at low to moderate speeds and as such do not provide accommodation for significant intake and exhaust valve travel into the combustion chamber.

at is needed is a combustion system which will allow high speed, two stroke or four stroke internal combustion engines to produce high thermal efficiency, fuel efficiency and output power as well as low emissions over a wide range of loads and speeds including high engine speeds. High engine speeds are defined as engine speeds in excess of 3,000 revolutions of the engine crankshaft per minute (rpm). In addition, combustion pressures, rates of combustion pressure rise and combustion knock would be maintained at moderate levels throughout the range of operating loads and speeds. Typical applications would be small engines (lawnmower, snowmobile), automotive engines (car and light truck) and racing engines.

STATEMENT OF THE INVENTION

The present invention, hereafter referred to as a high octane high cetane (HOHC) combustion process, is a method of operating a high speed two stroke or four stroke internal combustion engine to provide high levels of thermal efficiency, fuel efficiency and output power along with low levels of exhaust emissions. Combustion pressures, rates of combustion pressure rise and combustion knock are maintained at moderate levels throughout the range of operating loads and speeds. The HOHC combustion system as described below is specifically targeted for applications in which an engine will be operated over a wide range of loads and speeds including high engine speeds, i.e. in excess of 3000 revolutions of the engine crankshaft per minute (rpm). Typical applications would be small engines (lawnmower, snowmobile), automotive engines (car and light truck) and racing engines.

The HOHC combustion system of this invention provides the combustion chamber of a high speed internal combustion engine with varying amounts and proportions of two types of fuel having substantial differences in ignition characteristics. The first type of fuel has a high resistance to ignition, referred to as a having a high octane value, and includes but is not limited to fuels such as gasoline, alcohol, nitro methane and natural gas. The second type of fuel has a low resistance to ignition, referred to as having a high cetane value, and includes but is not limited to fuels such as monoglymes, diglymes, triglymes, dibutyl ether, and diethyl ether. The high cetane fuel has a substantially lower resistance to ignition (higher cetane value) than commercial diesel fuel which has a cetane value ranging from 37 to 55; the cetane value of the high cetane fuel used herein will always be higher than 60. However, much higher cetane values are preferred; i.e. preferably above 70, more preferably above 80 and above 90, and most preferably above 100. The high octane value fuel has an octane value of at least 84. Each type of fuel may consist of a mixture of one or more fuels, additives or compounds.

Accordingly, the present invention provides a method for operating an internal combustion engine, which is characterized by the steps of:

a) supplying a vaporized high octane fuel/air mixture to a combustion chamber of the engine, b) supplying high cetane fuel to the combustion chamber, and c) causing ignition of the fuels in the combustion chamber, wherein said high cetane fuel has a cetane value higher than 60, and wherein the amount of said high cetane fuel is less than 10% of the fuel requirements of the engine.

Generally, the "method of operating" as defined includes normal running of the engine in power producing mode, as opposed to simply starting an engine. The engine is run over a range of speeds from low to high speed, where high speeds are in excess of 3,000 rpm.

In a first embodiment of the invention, the high octane fuel and the high cetane fuel are mixed with air prior to entering the combustion chamber. In this case ignition may be effected by a spark plug.

In a second embodiment, the high octane fuel alone is mixed with air prior to entering the combustion chamber and the high cetane fuel is injected directly into the combustion chamber to cause ignition.

A third embodiment combines features of these two embodiments, and both mixes a charge of high cetane fuel with the high octane fuel and air before these enter the combustion chamber, and injects a further charge of high cetane pilot fuel directly into the combustion chamber to cause ignition.

Generally therefore, the HOHC combustion system provides a readily vaporized high octane fuel to the combustion air to form a homogeneous or near homogeneous mixture of combustion air and fuel for all embodiments, the manner in which the high cetane fuel is provided to the combustion air being dependent on the application. The three embodiments of the HOHC combustion system referred to above are described in more detail below indicating the manner in which the high cetane fuel is provided to the combustion chamber. In all three embodiments a high octane and a high cetane fuel(s) are provided to the engine combustion chamber.

Embodiment #1

In the first embodiment, directed at small, low cost engine applications, a readily vaporized high cetane fuel is provided to the combustion air in addition to the readily vaporized high octane fuel to form a homogeneous or near homogeneous mixture of combustion air and fuel. The high octane and high cetane fuels are provided to the engine combustion chamber in various ratios depending on engine operating parameters such as speed and load such that combustion is optimized with regard to combustion timing, duration and completeness. Combustible mixtures forming a homogeneous or near homogeneous mixture of combustion air and fuel range between lean at low loads and stoichiometric or richer than stoichiometric at high loads. Little throttling of the combustion air is employed thereby optimizing low load emissions, thermal efficiency and fuel efficiency. An electrical spark is provided at or near the end of the compression process, the timing of which depends on engine load and speed, to initiate combustion.

Embodiment #2

In the second embodiment, directed at racing applications, a readily vaporized high octane fuel is provided to the combustion air to form a homogeneous or near homogeneous mixture of combustion air and fuel. A high cetane fuel is provided to the combustion chamber at or near the end of the compression process, the timing of which depends on engine speed, to initiate the combustion process. High compression pressures, similar to CI engines, may be employed thereby generating high levels of thermal efficiency, output power and fuel efficiency. Throttling of the combustion air is employed to allow for additional vehicle control. Combustible mixtures forming a homogeneous or near homogeneous mixture of combustion air and fuel range between slightly lean at low loads and stoichiometric or richer than stoichiometric at high loads.

Embodiment #3

In the third embodiment, directed at automotive applications, a readily vaporized high cetane fuel is provided to the combustion air in addition to the readily vaporized high octane fuel to form a homogeneous or near homogeneous mixture of combustion air and fuel. The high octane and high cetane fuels forming the homogeneous or near homogeneous air/fuel mixture with the combustion air are provided to the engine combustion chamber in various ratios depending on engine operating parameters such as speed, load, intake air temperature and coolant temperature such that combustion is optimized with regard to combustion timing, duration and completeness. A high cetane fuel is provided to the combustion chamber at or near the end of the compression process, the timing of which depends on operating conditions, to initiate the combustion process; accordingly this embodiment combines features of embodiments #1 and 2. High compression pressures, similar to CI engines, may be employed generating high levels of thermal efficiency, output power and fuel efficiency. Combustible mixtures forming a homogeneous or near homogeneous mixture of combustion air and fuel range between very lean at low loads and stoichiometric or richer than stoichiometric at high loads. Little or no throttling of the combustion air is employed thereby optimizing low load emissions, thermal efficiency and fuel efficiency.

With reference to Embodiments #1 and 3, the HOHC combustion system supplies a readily vaporized high cetane fuel to the combustion chamber along with a readily vaporized high octane fuel to form a homogeneous or near homogeneous air/fuel mixture. Readily vaporized fuels are employed such that vaporization of the fuel occurs prior to the combustion process even at high engine speeds thereby improving combustion of the fuel, increasing thermal efficiency, increasing fuel efficiency and reducing exhaust THC and PM emissions. Commercial diesel fuel, having a high boiling point, would not be readily vaporized by the combustion air resulting in partial combustion of the diesel fuel and increased THC and PM emissions. High engine speeds would further exacerbate the situation since less time would be available for vaporization of the diesel fuel.

The ratio of high octane fuel to high cetane fuel provided to the combustion air to form a homogeneous or near homogeneous air/fuel mixture dictates the overall resistance of the air/fuel mixture to ignition. At low loads, lean air/fuel mixtures are employed to maximize thermal efficiency and fuel efficiency and to minimize NOx and PM. Lean air/fuel mixtures have a greater resistance to ignition and combustion than stoichiometric air/fuel mixtures and as such tend to reduce combustion speeds and produce incomplete combustion of some of the fuel, thereby lowering thermal efficiency and fuel efficiency below optimal values, as well as increasing THC emissions. The HOHC combustion system reduces the resistance to ignition of lean air/fuel mixtures by reducing the quantity of high octane fuel and increasing the quantity of high cetane fuel supplied to the combustion air to form a homogeneous or near homogeneous air/fuel mixture.

HOHC lean air/fuel mixture combustion occurs at a high rate due to the readily vaporized high cetane fuel, thereby reducing incomplete combustion and THC emissions and further increasing thermal efficiency and fuel efficiency. As engine load increases the quantity of fuel supplied to the combustion air increases and the air/fuel mixture becomes less lean. The ratio of high octane fuel to high cetane fuel in the air/fuel mixture is increased to provide optimal resistance to autoignition. At maximum load the quantity of high cetane fuel in the air/fuel mixture may be reduced to zero, depending on operating conditions.

High cetane fuels have a low resistance to ignition and as such only minute quantities, for example less than 10%, of high cetane fuel are required to significantly alter the resistance to ignition of the homogeneous air/fuel mixture in comparison to moderate cetane fuels such as commercial diesel fuel. Since the fuel consumption rate for the high cetane fuel would be minimal, a small fuel reservoir could be employed which would require infrequent refilling, thereby providing increased convenience to the operator. Refilling of the high cetane fuel reservoir would ideally occur at engine lubricating oil change intervals.

With reference to Embodiments #2 and 3, ignition of the homogeneous or near homogeneous air/fuel mixture contained within the combustion chamber near the end of the compression process is accomplished by injection of a high cetane fuel, referred to as high cetane pilot injection. The ignition delay period for the high cetane pilot fuel is substantially less than the ignition delay period of commercial diesel fuel since the pilot fuel has a higher cetane value and lower resistance to ignition than commercial diesel fuel. Minimal dispersion of the high cetane fuel occurs prior to ignition. As such the combustion process occurs in the form of rapidly propagating, multiple flame fronts of injected high cetane pilot fuel, as described in more detail below. The short ignition delay period and rapid flame front propagation allows high engine speeds to be attained with moderate combustion pressures, rates of combustion pressure rise and low levels of combustion knock.

BRIEF DESCRIPTION OF THE DRAWINGS

The invention will now be described with reference to the following drawings which show preferred embodiments, and in which:

FIG. 4 is a cross-section through the upper part of the combustion chamber of the engine of Embodiment #3;

DETAILED DESCRIPTION

Figure 1:
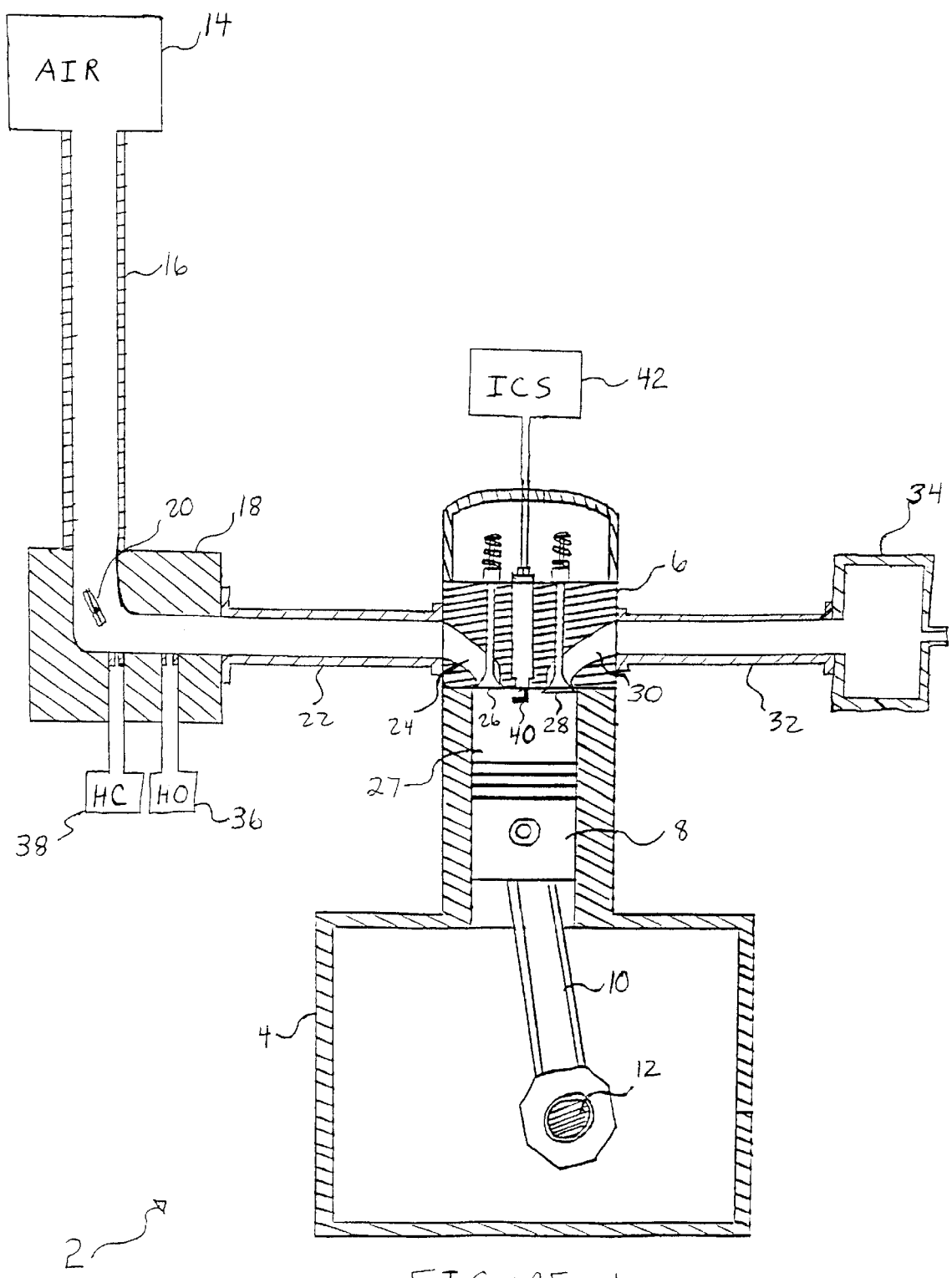
FIG. 1 is sectional elevation of an engine in accordance with Embodiment #1 referred to above.

Embodiment #1; FIG. 1.

Listing of Components

2) Engine assembly
4) Crankcase and cylinder assembly
6) Cylinder head assembly
8) Piston
10) Connecting rod
12) Crankshaft
14) Combustion air supply
16) Combustion air inlet duct
18) Carburetor
20) Combustion air throttle
22) Combustion air/fuel mixture inlet duct
24) Inlet port
26) Inlet valve
27) Combustion chamber
28) Exhaust outlet valve
30) Exhaust outlet port
32) Exhaust outlet duct
34) Exhaust muffler
36) High octane fuel supply
38) High cetane fuel supply
40) Spark plug
42) Ignition control system (ICS)

With reference to Embodiment #1 (FIG. 1), a typical low cost, small four stroke engine application is described. Engine assembly 2 includes a crankcase and cylinder assembly 4, a cylinder head assembly 6, a piston 8, a connecting rod 10 and a crankshaft 12 and combustion chamber 27.

During engine operation, beginning with induction of the combustion air 14, rotation of the crankshaft 12 causes the connecting rod 10 and the piston 8 to translate in the cylinder assembly 4 from a point nearest the cylinder head assembly 6 to a point furthest from the cylinder head assembly 6. The inlet valve 26 is open while the exhaust outlet valve 28 remains closed. The descending piston 8 causes a vacuum in the combustion chamber 27 between the piston 8 and the cylinder head assembly 6, such that combustion air 14 traverses through the combustion air inlet duct 16, into the carburetor 18, past the combustion air throttle 20, into the combustion air/fuel mixture inlet duct 22, through the inlet port 24 and past the inlet valve 26 into the combustion chamber 27.

During induction of the combustion air, high octane fuel from supply 36 traverses into the carburetor 18 to mix with the combustion air at a point in the carburetor 18. The high octane fuel vaporizes in the combustion air and passes to the combustion chamber 27 with the combustion air.

The quantity of high octane fuel entering the combustion air is controlled by internal passages in the carburetor 18 and is partially dependent on the position of the combustion air throttle valve 20 and engine speed.

During induction of the combustion air, high cetane fuel passes from supply 38 into the carburetor 18 to mix with the combustion air 14 at a point in the carburetor 18. The high cetane fuel vaporizes in the combustion air and passes to the combustion chamber 27 with the combustion air. The quantity of high cetane fuel entering the combustion air is controlled by internal passages in the carburetor 18 and is partially dependent on the position of the combustion air throttle valve 20 and engine speed.

Rotation of the crankshaft 12 causes the connecting rod 10 and piston 8 to reach a point furthest from the cylinder head assembly 6. Shortly thereafter rotation of the crankshaft 12 causes the connecting rod 10 and piston 8 to travel from a point furthest from the cylinder head assembly towards the cylinder head assembly 6, the combustion air inlet valve 26 is closed and the flow of combustion air, high octane fuel and high cetane fuel 38 into the combustion chamber 27 is terminated.

Further rotation of crankshaft 12 causes the connecting rod 10 and the piston 8 to translate further towards the cylinder head assembly 6. Both the inlet valve 26 and the exhaust outlet valve 28 are closed. As the piston 8 moves towards the cylinder head assembly 6 the combustion air containing the high octane fuel and high cetane fuel is compressed within the combustion chamber 27, referred to as the compression process.

Near the end of the compression process further rotation of crankshaft 12 causes the connecting rod 10 and the piston 8 to translate to a position very near cylinder head assembly 6, at this time an electrical signal is sent from the ignition control system 42 to the spark plug 40 causing an electrical discharge or spark within the combustion chamber 27. The spark ignites a minute quantity of the combustion air, high octane fuel and high cetane fuel mixture in the combustion chamber 27, generating a slow to moderate speed flame front which travels throughout the combustion chamber 27. The timing of the spark is controlled by the ignition control system 42 based on engine speed.

Further rotation of crankshaft 12 causes the connecting rod 10 and the piston 8 to translate from a point near the cylinder head assembly 6 towards a point furthest from the cylinder head assembly 6, referred to as the expansion process. Both the inlet valve 26 and the exhaust outlet valve 28 are closed and the combustion gases in the combustion chamber 27 apply high pressure to the piston 8 generating power. As the piston 8 moves away from the cylinder head assembly 6 the combustion gases in the combustion chamber 27 expand. As the piston nears a point furthest from the cylinder head assembly 6 the exhaust outlet valve 28 is opened. High pressure combustion gases in the combustion chamber 27 leave through the exhaust valve 28, the exhaust port 30, the exhaust duct 32, and through the exhaust muffler 34 exiting into the atmosphere. This exhaust process continues as further rotation of crankshaft 12 causes the connecting rod 10 and the piston 8 to move from a point furthest from the cylinder head assembly 6 towards a point nearest the cylinder head assembly 6, at which time the exhaust valve 28 closes, the intake valve 26 opens and the aforementioned induction, compression, expansion and exhaust processes are re-iterated.

Figure 2:
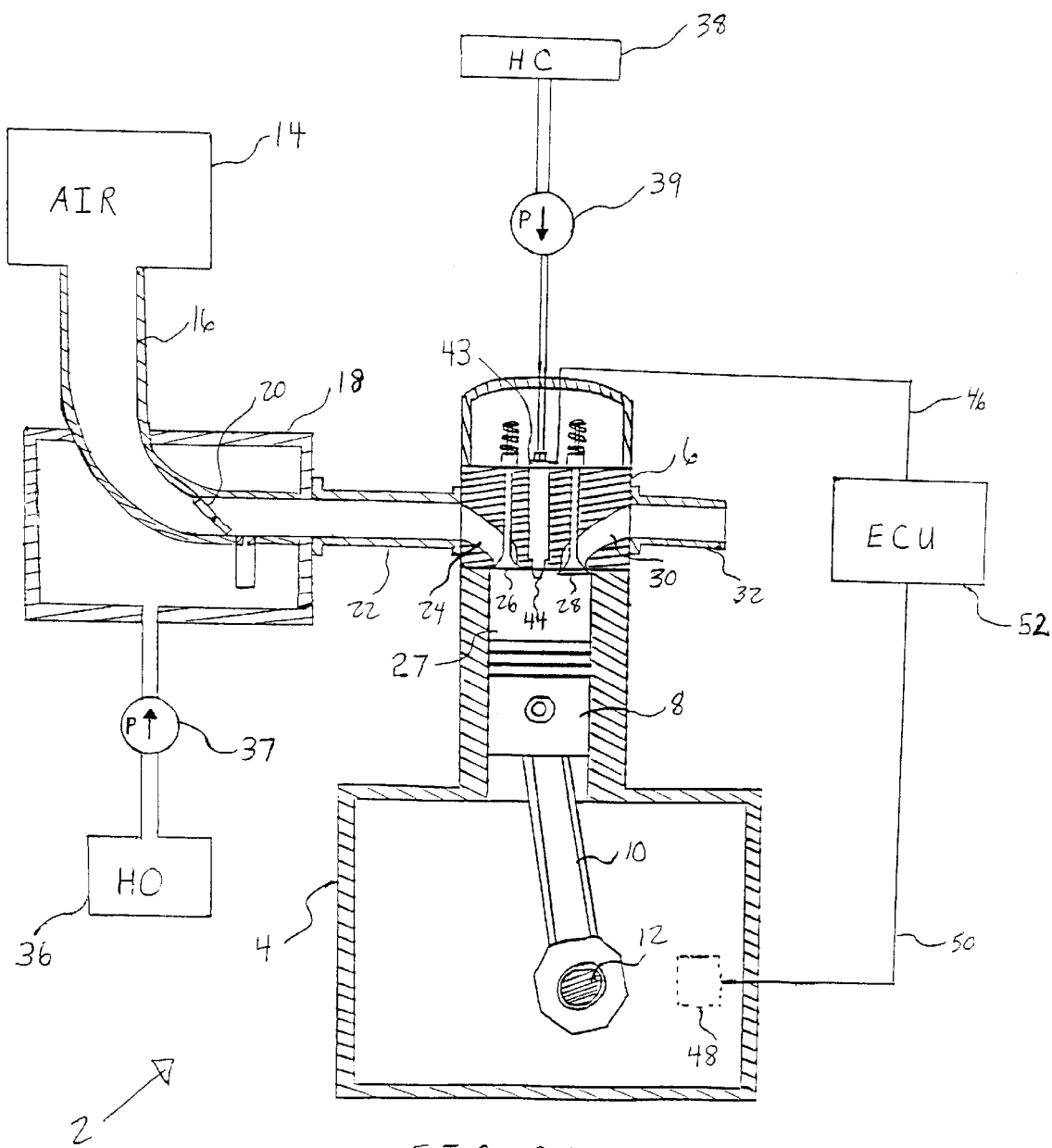
FIG. 2 is a similar section of an engine in accordance with Embodiment #2 referred to above.

Embodiment #2; FIG. 2.

Listing of Components

2) Engine assembly
4) Crankcase/cylinder assembly
6) Cylinder head assembly
8) Piston
10) Connecting rod
12) Crankshaft
14) Combustion air supply
16) Combustion air inlet duct
18) Carburetor
20) Combustion air throttle
22) Combustion air/fuel mixture inlet duct
24) Inlet port
26) Inlet valve
27) Combustion chamber
28) Exhaust outlet valve
30) Exhaust outlet port
32) Exhaust outlet duct
36) High octane fuel supply
37) High octane fuel pump
38) High cetane pilot fuel supply
39) High cetane pilot fuel pump
43) High cetane pilot fuel injector solenoid valve
44) Multiple orifice high cetane pilot fuel injector
46) High cetane pilot fuel injector solenoid valve signal wire
48) Crankshaft angular position sensor
50) Crankshaft angular position sensor signal wire
52) Electronic Control Unit (ECU)

With reference to Embodiment #2 (FIG. 2), a typical four stroke racing engine application is described. Engine assembly 2 includes a crankcase/cylinder assembly 4, a cylinder head assembly 6, a piston 8, a connecting rod 10 and a crankshaft 12 and combustion chamber 27.

During engine operation, beginning with induction of the combustion air from supply 14, rotation of the crankshaft 12 causes the connecting rod 10 and the piston 8 to translate in the cylinder assembly 4 from a point nearest the cylinder head assembly 6 to a point furthest from the cylinder head assembly. The inlet valve 26 is open while the exhaust outlet valve 28 remains closed. The descending piston 8 causes a vacuum between the piston 8 and the cylinder head assembly 6, referred to as the combustion chamber 27, such that combustion air 14 traverses through the combustion air inlet duct 16, into the carburetor 18, past the combustion air throttle 20, through the combustion air/fuel inlet duct 22 and inlet port 24, then past the inlet valve 26 into the combustion chamber 27. The quantity of combustion air 14 entering the combustion chamber 27 is controlled by the position of the combustion air throttle valve 20. The position of the combustion air throttle valve 20 is controlled by the operator's demand for load and speed.

During induction of the combustion air, high octane fuel from supply 36 moves from the high octane fuel pump 37 into the carburetor 18 to mix with the combustion air at a point in the carburetor 18. The high octane fuel vaporizes in the combustion air and passes to the combustion chamber 27 with the combustion air. The quantity of high octane fuel entering the combustion air is controlled by internal passages in the carburetor 18 and is dependent on the position of the combustion air throttle valve 20 and engine speed.

Rotation of the crankshaft 12 causes the connecting rod 10 and piston 8 to reach a point furthest from the cylinder head assembly 6. Shortly thereafter rotation of the crankshaft 12 causes the connecting rod 10 and piston 8 to travel from a point furthest from the cylinder head assembly towards the cylinder head assembly 6, the inlet valve 26 is closed and the flow of combustion air and high octane fuel into the combustion chamber 27 is terminated.

Further rotation of crankshaft 12 causes the connecting rod 10 and the piston 8 to translate further towards the cylinder head assembly 6. Both the valve 26 and the exhaust outlet valve 28 are closed. As the piston 8 moves towards the cylinder head assembly 6 the combustion air containing the high octane fuel is compressed within the combustion chamber 27, referred to as the compression process.

Near the end of the compression process further rotation of crankshaft 12 causes the connecting rod 10 and the piston 8 to translate to a position very near cylinder head assembly 6, at this time an electrical signal is sent from the ECU 52 to the high cetane pilot fuel injector solenoid valve 43 through the high cetane pilot fuel injector signal wire 46 causing the high cetane pilot fuel injector solenoid valve to open. High cetane pilot fuel from supply 38 passes from the high cetane pilot fuel pump 39 to the multiple orifice high cetane pilot fuel injector 44, which has at least three orifices, and is injected into the combustion chamber 27. After a short ignition delay period the high cetane pilot fuel in the combustion chamber 27 ignites generating rapidly propagating multiple flame fronts which ignite the high octane fuel within the combustion chamber 27 which was previously vaporized in the combustion air. The ECU 52 controls the quantity and timing of the high cetane pilot fuel injected into the combustion chamber 27 based on an electrical signal is supplied to the ECU 52 from the crankshaft angular position sensor 48 through the crankshaft angular position sensor wire 50.

Further rotation of crankshaft 12 causes the connecting rod 10 and the piston 8 to translate from a point near the cylinder head assembly 6 towards a point furthest from the cylinder head assembly 6, referred to as the expansion process. Both the air inlet valve 26 and the exhaust outlet valve 28 are closed and the combustion gases in the combustion chamber 27 apply high pressure to the piston 8 generating power. As the piston 8 translates away from the cylinder head assembly 6 the combustion gases in the combustion chamber 27 expand. As the piston nears a point furthest from the cylinder head assembly 6 the exhaust outlet valve 28 is opened. High pressure combustion gases in the combustion chamber 27 pass through the exhaust valve 28, the exhaust port 30, the exhaust duct 32 exiting into the atmosphere. This is referred to as the exhaust process and continues as further rotation of crankshaft 12 moves the piston 8 towards a point nearest the cylinder head assembly 6, at which time the exhaust valve 28 closes, the intake valve 26 opens and the aforementioned induction, compression, expansion and exhaust processes are re-iterated.

Figure 3:
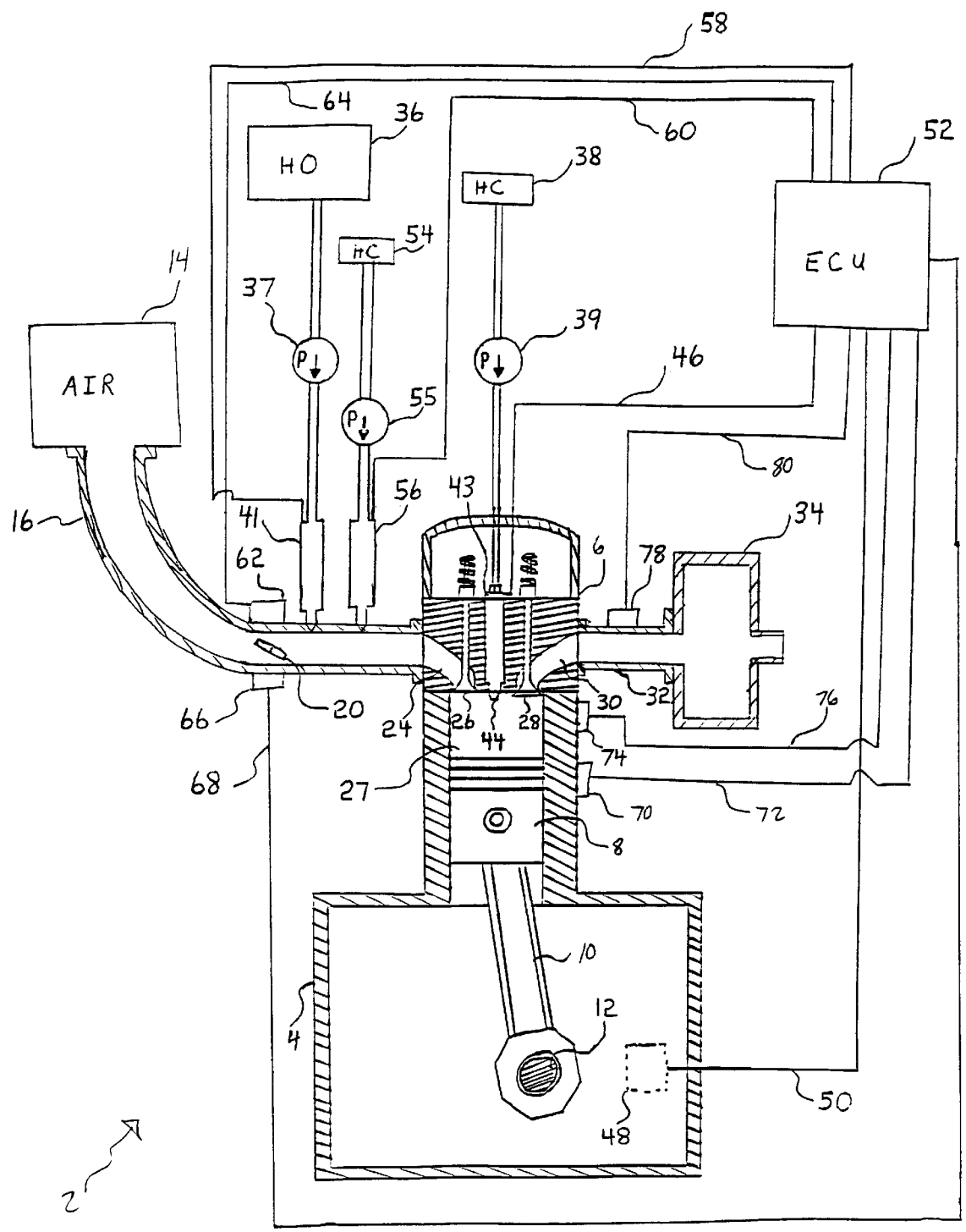
FIG. 3 is a similar section of an engine in accordance with Embodiment #3 referred to above.

Embodiment #3; FIG. 3.

Listing of Components

2) Engine assembly
4) Crankcase/cylinder assembly
6) Cylinder head assembly
8) Piston
10) Connecting rod
12) Crankshaft
14) Combustion air supply
16) Combustion air inlet duct
20) Combustion air throttle
24) Inlet port
26) Inlet valve
27) Combustion chamber
28) Exhaust outlet valve
30) Exhaust outlet port
32) Exhaust outlet duct
34) Exhaust muffler
36) High octane fuel supply
37) High octane fuel pump
38) High cetane pilot fuel supply
39) High cetane pilot fuel pump
41) High octane fuel injector
43) High cetane pilot fuel injector solenoid valve
44) Multiple orifice high cetane pilot fuel injector
46) High cetane pilot fuel injector signal wire
48) Crankshaft angular position sensor
50) Crankshaft angular position sensor signal wire
52) Electronic control unit (ECU)
54) High cetane fuel supply
55) High cetane fuel pump
56) High cetane fuel injector
58) High octane fuel injector signal wire
60) High cetane fuel injector signal wire
62) Combustion air temperature sensor
64) Combustion air temperature sensor signal wire
66) Combustion air throttle controller
68) Combustion air throttle controller signal wire
70) Coolant temperature sensor
72) Coolant temperature sensor signal wire
74) Combustion knock sensor
76) Combustion knock sensor signal wire
78) Oxygen sensor
80) Oxygen sensor signal wire With reference to Embodiment #3 (FIG. 3), a typical low emission four stroke engine automotive application is described. Engine assembly 2 includes a crankcase cylinder assembly 4, a cylinder head assembly 6, a piston 8, a connecting rod 10 and a crankshaft 12 and combustion chamber 27.

During engine operation, beginning with induction of the combustion air, rotation of the crankshaft 12 causes the connecting rod 10 and the piston 8 to translate in the cylinder assembly 4 from a point nearest the cylinder head assembly 6 to a point furthest from the cylinder head assembly. The inlet valve 26 is open while the exhaust outlet valve 28 remains closed. The descending piston 8 causes a vacuum between the piston 8 and the cylinder head assembly 6 in the combustion chamber 27, such that combustion air passes through the combustion air inlet duct 16, past the combustion air throttle 20, through the inlet port 24 and past the inlet valve 26 into the combustion chamber 27.

During induction of the combustion air, high octane fuel passes from the high octane fuel supply 36 and pump 37 to the high octane fuel injector 41 and is injected by the high octane fuel injector into the combustion air at a point along the combustion air inlet duct 16. The injected high octane fuel vaporizes in the combustion air and passes to the combustion chamber 27 with the combustion air. The quantity of high octane fuel injected into the combustion air is controlled by an electrical signal supplied by the electronic control unit (ECU) 52 through the high octane fuel injector signal wire 58.

During induction of the combustion air, high cetane fuel from supply 54 is pumped by the high cetane fuel pump 55 to the high cetane fuel injector 56 and is injected by this fuel injector into the combustion air at a point along the combustion air inlet duct 16. The injected high cetane fuel vaporizes in the combustion air and passes to the combustion chamber 27 with the combustion air. The quantity of high cetane fuel injected into the combustion air at this stage is controlled by an electrical signal supplied by the electronic control unit (ECU) 52 through the high cetane fuel injector signal wire 60.

Rotation of the crankshaft 12 causes the piston 8 to reach a point furthest from the cylinder head assembly 6, and shortly thereafter further rotation causes the piston 8 to travel from the point furthest from the cylinder head assembly towards the cylinder head assembly, the inlet valve 26 is closed and the flow of combustion air, high octane fuel and high cetane fuel into the combustion chamber 27 is terminated.

Further rotation of crankshaft 12 causes the connecting rod 10 and the piston 8 to translate further towards the cylinder head assembly 6. Both the inlet valve 26 and the exhaust outlet valve 28 are closed. As the piston 8 translates towards the cylinder head assembly 6 the combustion air containing the injected high octane fuel and injected high cetane fuel is compressed within the combustion chamber 27.

Near the end of the compression process further rotation of crankshaft 12 causes the connecting rod 10 and the piston 8 to move to a position very near cylinder head assembly 6, at this time an electrical signal is sent from the ECU 52 to the high cetane pilot fuel injector solenoid valve 43 through the high cetane pilot fuel injector signal wire 46 causing the high cetane pilot fuel injector solenoid valve 43 to open. High cetane pilot fuel from supply 38 is pumped by the high cetane pilot fuel pump 39 to the multiple orifice high cetane pilot fuel injector 44 which has at least three orifices and is injected into the combustion chamber 27. After a short ignition delay period the high cetane pilot fuel in the combustion chamber 27 ignites generating rapidly propagating multiple flame fronts which ignite the mixture of high octane fuel and the high cetane fuel within the combustion chamber 27 which was previously vaporized in the combustion air. The quantity and timing of the high cetane pilot fuel injected into the combustion chamber is controlled by an electrical signal supplied from the ECU 52 to the high cetane pilot fuel injector solenoid valve 43 using the high cetane pilot fuel injector signal wire 46.

Electrical signals are supplied to the ECU 52 from the combustion air temperature sensor 62, the crankshaft angular position sensor 48, the coolant temperature sensor 70, the combustion knock sensor 74 and the oxygen sensor 78 through the corresponding signal wires (50, 64, 72, 76 and 80). Based on the sensor signals the ECU 52 controls the quantity of high octane fuel and high cetane fuel injected into the combustion air and the quantity and timing of the high cetane pilot fuel injected into the combustion chamber 27. In addition, the ECU 52 sends an electrical signal through the combustion air throttle control signal wire 68 to control the position of the combustion air throttle 20. The combustion air throttle 20 remains open for most operating conditions but may be closed slightly at no load conditions to reduce the quantity of combustion air entering the combustion chamber 27.

Further rotation of crankshaft 12 causes the connecting rod 10 and the piston 8 to move from a point near the cylinder head assembly 6 towards a point furthest from the cylinder head assembly 6, referred to as the expansion process. Both the inlet valve 26 and the exhaust outlet valve 28 are closed and the combustion gases in the combustion chamber 27 apply high pressure to the piston 8 generating power. As the piston 8 moves away from the cylinder head assembly 6 the combustion gases in the combustion chamber expand. As the piston nears a point furthest from the cylinder head assembly 6 the exhaust outlet valve 28 is opened. High pressure combustion gases in the combustion chamber 27 leave through the exhaust valve 28, the exhaust port 30, the exhaust duct 32, and through the exhaust muffler 34 exiting into the atmosphere. This exhaust process continues as further rotation of crankshaft 12 causes the piston 8 to translate from a point furthest from the cylinder head assembly 6 towards a point nearest the cylinder head assembly, at which time the exhaust valve 28 closes, the intake valve 26 opens and the aforementioned induction, compression, expansion and exhaust processes are repeated.

FIG. 4 shows a cross-section through the top of the combustion chamber 27 of Embodiment #3 just described, indicating a typical multiple orifice high cetane pilot fuel injection and ignition process. As shown, the injector 44 is situated centrally in the cylinder so as to inject the pilot fuel directly into the combustion chamber which is in communication with the piston, as compared to arrangements such as that of U.S. Pat. No. 5,050,550 in which the pilot fuel is indirectly injected via a pre-combustion chamber. The injector has a series of radial orifices 104 each producing a high velocity jet 106 of fuel. The high cetane pilot fuel jets 106, having a low resistance to ignition, ignite a short distance away from the injector nozzle 104 with minimal dispersion of the fuel, forming a series of flames or flame fronts 108 (eight depicted) which travel radially towards the outermost portion of the combustion chamber 27 and towards each other, igniting the homogeneous air/fuel mixture 110. The high cetane fuel flame fronts 108 travel at a high velocity, several times higher than the normal single flame front velocity developed by a spark, since the high cetane fuel is injected into the combustion chamber at high velocities under high pressure by the injector 44. Pilot injection pressures of at least 1,000 psi, and preferably more than 1,500 psi, are desirable for this process. The rapidly moving high cetane fuel flame fronts cause ignition of the homogeneous air/fuel mixture in a rapid but controlled manner without autoignition of the fuel/air mixture itself. In other words, the flame fronts consume the homogeneous air/fuel mixture before the homogeneous air/fuel mixture can autoignite from the increasing combustion chamber pressure and temperature. The rapidly moving high cetane flame fronts and short flame propagation distance, in comparison to a single point spark ignition, minimizes the time available for autoignition of the homogeneous or near homogeneous air/fuel mixture. Also, the fact that the pilot fuel is acting on a homogeneous mixture of high octane and high cetane fuel generates much quicker combustion than can be achieved by combustion of diesel fuel in air, as in a conventional diesel engine. Accordingly, the process is much more suited to a high speed engine than a conventional diesel.

Figure 5:
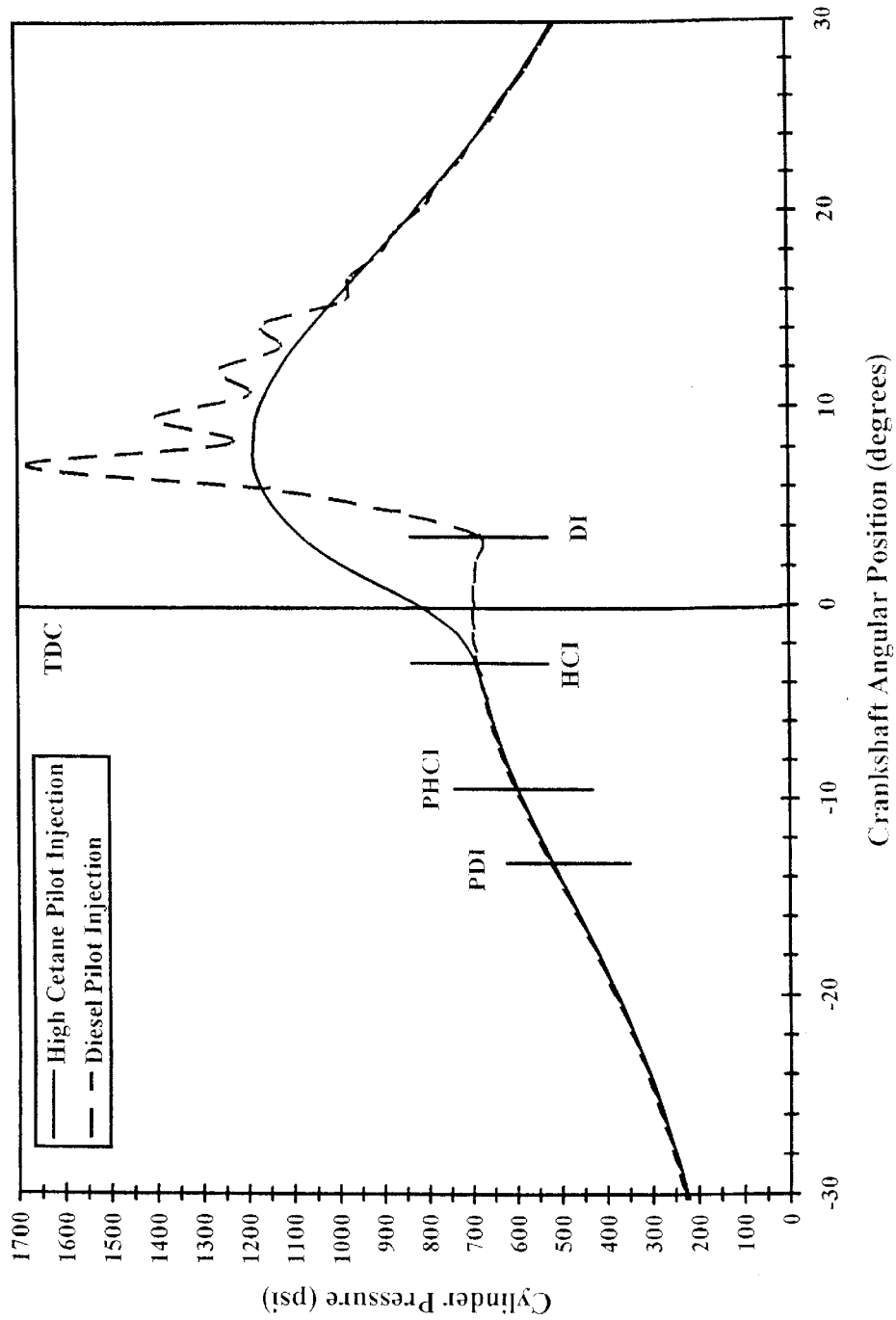
FIG. 5 is a graph showing a comparison between pressure and crank position of the Embodiment #2 engine, operating on a homogeneous air/gasoline mixture with high cetane pilot fuel injection, as compared to diesel fuel pilot injection.

FIG. 5 indicates the compression and combustion pressures developed for engine operation using HOHC combustion in accordance with this invention, specifically as described with reference to Embodiment #2, with multiple orifice high cetane pilot injection in comparison to multiple orifice diesel fuel pilot injection at an engine speed of 3800 rpm. The cetane value of the high cetane pilot fuel was in excess of 100 in comparison to a cetane value of 47 for the commercial diesel. In both instances gasoline was supplied to the combustion air in the form of a stoichiometric homogeneous air/fuel mixture. The TDC line at crankshaft angular position 0 degrees indicates the end of the compression process. The compression process occurs to the left of the TDC line and the expansion process occurs to the right of the TDC line. Pilot diesel injection (PDI) occurs 13 crankshaft degrees before the end of the compression process and diesel ignition (DI) occurs 3 crankshaft degrees after the end of the compression process, for an ignition delay of 16 crankshaft degrees. Pilot high cetane injection (PHCI) occurs 9.5 crankshaft degrees before the end of the compression process and high cetane ignition (HCI) occurs 3 crankshaft degrees before the end of the compression process, for an ignition delay of 6.5 crankshaft degrees. The high cetane pilot fuel ignites rapidly with respect to crankshaft rotation in comparison to the diesel fuel (6.5 vs. 16 crankshaft degrees) such that ignition timing is controlled precisely. Peak combustion pressures, rates of combustion pressure rise are significantly reduced for high cetane pilot fuel injection in comparison to diesel pilot injection. In addition, the quantity of pilot fuel injected was significantly reduced for the high cetane pilot injection, with the quantity of high cetane fuel pilot injection being approximately four times less than the quantity of diesel fuel pilot injection.

Due to the lengthy ignition delay period of diesel fuel at high engine speeds, the diesel fuel disperses in the combustion chamber prior to ignition such that multiple site autoignition of the diesel fuel occurs. Multiple flame front combustion along the fuel sprays as described for high cetane pilot injection does not occur with diesel fuel for small quantities of diesel fuel pilot injection at high engine speeds. Diesel pilot injection at high engine speeds results in high combustion pressures and rates of pressure rise caused by multiple site instantaneous autoignition of the homogeneous air/fuel mixture. HOHC combustion of high cetane pilot, by contrast, generates rapidly propagating high cetane flame fronts resulting in rapid controlled combustion of the homogeneous air/fuel mixture with moderate combustion pressures, rates of combustion pressure rise and low levels of combustion knock. As such, HOHC combustion with high cetane fuel injection at or near the end of the compression process to initiate ignition, allows high compression pressures to be employed, similar to CI engines, without excessive combustion pressures and rates of combustion pressure rise associated with simultaneous autoignition of large portions of the air/fuel mixture. The increased compression pressures result in increased thermal efficiency, output power and fuel efficiency. At low and moderate loads the high cetane pilot fuel's low resistance to ignition and the multiple rapidly propagating flame fronts allow very lean homogeneous air/fuel mixtures to be efficiently ignited and combusted, thereby further increasing thermal efficiency, fuel efficiency and reducing NOx, PM and THC emissions.

It should be noted that the three embodiments outlined below do not indicate all of the possible methods of supplying a homogeneous or near homogeneous air/fuel mixture to the combustion chamber. The readily vaporized high octane and/or high cetane fuels supplied to the combustion air prior to spark ignition or high cetane pilot fuel injection may be added to the combustion air in various manners including but not limited to carburetion, fuel injection into the combustion air prior to the combustion air entering the cylinder and fuel injection into the combustion air within the cylinder. In addition, various other emissions reduction apparatus such as exhaust gas recirculation (EGR) systems may be employed.

I claim:

1. A method for operating a reciprocating internal combustion engine of the piston-in-cylinder type, characterized by the steps of:
   a) supplying a vaporized fuel/air mixture to a combustion chamber of the engine, said mixture including a high octane fuel;
   b) injecting pilot fuel, in the form of a high cetane fuel, directly into the combustion chamber to cause ignition of said fuel/air mixture, said combustion chamber being directly in communication with the piston, said pilot fuel being injected in such conditions as to form multiple flame fronts between the high cetane fuel and said fuel/air mixture but without auto-ignition of said fuel/air mixture itself;
   wherein said high cetane fuel has a cetane value of at least 100 and wherein the amount of said high cetane fuel is less than 10% of the fuel requirements of the engine.

2. A method according to claim 1, wherein the method includes running the engine at over 3,000 rpm.

3. A method according to claim 1, wherein the high octane fuel has an octane value of at least 84.

4. A method according to claim 1, wherein the high cetane pilot fuel is injected through at least three orifices to form said multiple flame fronts between the high cetane pilot fuel and the said fuel/air mixture in the combustion chamber.

5. A method according to claim 1, wherein the pressure of injection is at least 1,000 p.s.i.

6. A method according to claim 1, wherein the pressure of injection is at least 1,500 p.s.i.

7. A method according to claim 1, wherein said fuel/air mixture supplied to the combustion chamber includes a high cetane fuel.

8. A method according to claim 1, wherein said vaporized fuel/air mixture has equivalence ratios which range from leaner than stoichiometric to richer than stoichiometric.

9. A method according to claim 1, wherein the pilot fuel is injected through multiple orifices to form said multiple flame fronts.

* * * * *